United States Patent [19]

Sandler

[11] 4,011,194
[45] Mar. 8, 1977

[54] SMOKE RETARDANTS FOR POLYVINYL HALIDES AND POLYSTYRENES

[75] Inventor: Stanley Robert Sandler, Springfield, Pa.

[73] Assignee: Pennwalt Corporation, Philadelphia, Pa.

[22] Filed: Oct. 16, 1975

[21] Appl. No.: 623,152

[52] U.S. Cl. .................. 260/45.75 C; 260/45.75 R; 260/45.75 V; 260/45.75 B; 260/45.75 M; 260/45.8 N; 260/45.8 NZ; 260/45.8 SN

[51] Int. Cl.² .................... C08K 5/59; C08K 5/47; C08K 5/36

[58] Field of Search ............... 260/45.75, 45.8 SN, 260/45.8 N, 45.75 P, 45.75 S, 45.75 R, 45.75 M, 45.75 C, 45.75 B, 45.75 N, 45.8 NZ; 526/83, 344, 346

[56] References Cited

UNITED STATES PATENTS

| | | | |
|---|---|---|---|
| 2,727,879 | 12/1955 | Vincent | 260/45.75 R |
| 2,802,811 | 8/1957 | Somerville et al. | 260/45.75 |
| 3,004,949 | 10/1961 | Chevassus | 260/45.75 R |
| 3,333,001 | 7/1967 | Albert et al. | 260/45.8 SN |
| 3,475,372 | 10/1969 | Gable | 260/45.8 SN |
| 3,635,862 | 1/1972 | Dunn | 260/45.95 B |

FOREIGN PATENTS OR APPLICATIONS 791,184  2/1958  United Kingdom

*Primary Examiner*—V. P. Hoke

[57] ABSTRACT

Metal-2-mercaptobenzothiazoles, metal-2-mercaptobenzoxazoles, and metal-2-mercaptobenzimidazoles are used as smoke retardants for polyvinyl halides and polystyrenes and have the general structure of

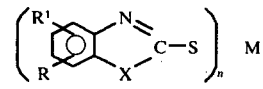

where R and R¹ can be a hydrogen, alkyl, aryl, alkylaryl or halogen, X is either oxygen, sulfur or NR², M is a metal, n is an integer equal to the valence of the metal and R² can be a hydrogen, alkyl, aryl or alkylaryl group.

16 Claims, No Drawings

SMOKE RETARDANTS FOR POLYVINYL HALIDES AND POLYSTYRENES

FIELD OF INVENTION

This invention relates to the novel use of metal-2-mercaptobenzothiazoles, metal-2-mercaptobenzoxazoles, and metal-2-mercaptobenzimidozoles as smoke retardants for polyvinyl halides and polystyrenes.

STATE OF THE PRIOR ART

Smoke and especially dense smoke is a hazard during a fire since it hampers fire-fighting measures and can obscure means of escape. Therefore, it is desirable to develop building materials that emit less smoke during combustion as an added safety feature. In the past, smoke suppressants have had one or more of the following disadvantages: low-molecular-weight, insolubility (especially inorganics such as $Fe_2O_3$, and $MoO_3$), and toxicity. There is, therefore, a need to develop more compatible and stable additives to reduce smoke at a reasonable cost.

Ferrocene (dicyclopentadienyl iron) has recently been commercialized under the trademark FE55 by Arapahoe Chem., Inc. [see Tech. Brochure B-2191 (1974) and J. J. Kracklacer and C. J. Sparkes, Soc. Plast. Eng. Tech. paper 20, 616(1974); *Chem. Abstracts* 81, 170410 (1974)]. Ferrocene has the disadvantage of being volatile at milling temperatures of 130°–145° C because of its high vapor pressure (vapor pressure 2.6 mm Hg at 100° C). For example, in laboratory work, as a result of the high volatility of FE-55 it is necessary to prepare the formulations in a closed system such as a Banbury mixer or Brabender Plasticorder. The use of an open system such as a roll-mill results in significant losses of the FE-55. FE-55 has also been reported by Arapahoe not to be suitable for PVC with more than 10 phr (parts per hundred parts resin) plasticizer since losses of FE-55 due to volatility and migration occur on long-term aging.

Smoke retardants have been reported in the following U.S. patents:

(a) For polyvinyl chloride (PVC) (including copolymers): U.S. Pat. Nos. 3,845,001; 3,841,151; 3,819,577; 3,862,086; 3,723,139; 3,846,372; 3,870,679; 3,822,234; 3,878,167; 3,869,420; 3,880,802.

(b) For polystyrene: U.S. Pat. Nos. 3,793,404; 3,825,520; 3,766,157.

Metal-2-mercaptobenzothiazoles have been described in the prior art as being useful as flame retardants for polycarbonates in U.S. Pat. No. 3,475,372 but their use in reducing smoke on burning has not been reported.

SUMMARY OF THE INVENTION

This invention concerns:

(A) A smoke-retardant polymer composition comprising a polyvinyl halide resin or a polystyrene resin admixed with a sufficient amount to reduce smoking of a metal-2-mercaptobenzothiazole, metal-2-mercaptobenzoxazole or metal-2-mercaptobenzimidazole having the general structure:

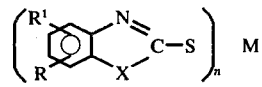

wherein:

(a) R, $R^1$ and $R^2$ are independently selected from the group consisting of hydrogen, alkyl of 1 to 4 carbons, aryl of 6 to 10 carbons, and alkylaryl of 7 to 12 carbons. In addition R and $R^1$ can also be a halogen.

(b) X is either an oxygen, sulfur or $NR^2$ group;

(c) M is a metal selected from the group consisting of beryllium, magnesium, calcium, strontium, barium, titanium, zirconium, antimony, bismuth, chromium, molybdenum, tungsten, manganese, iron, ruthenium, osmium, cobalt, rhodium, iridium, nickel, palladium, platinum, copper, silver, zinc, cadmium, mercury, aluminum, germanium, tin, and lead; and (d) $n$ is an integer equal to the valence of the metal M.

(B) The process of preparing a smoke retardant polyvinyl halide resin or polystyrene resin comprising mixing with a polyvinyl halide resin or a polystyrene resin a sufficient amount to reduce smoking of a metal-2-mercaptobenzothiazole, or metal-2-mercaptobenzoxazole, or metal-2-mercaptobenzimidazole having the structure:

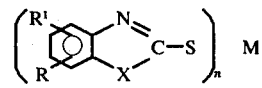

wherein:

(a) R, $R^1$ and $R^2$ are independently selected from the class consisting of hydrogen, alkyl of 1 to 4 carbons, aryl of 6 to 10 carbons, and alkylaryl of 7 to 12 carbons. In addition R and $R^1$ can also be halogen.

(b) X is either oxygen, sulfur or a $NR^2$ group;

(c) M is a metal selected from the group consisting of beryllium, magnesium, calcium, strontium, barium, titanium, zirconium, antimony, bismuth, chromium, molybdenum, tungsten, manganese, iron, ruthenium, osmium, cobalt, rhodium, iridium, nickel, palladium, platinum, copper, silver, zinc, cadmium, mercury, aluminum, germanium, tin, and lead; and (d) $n$ is an integer equal to the valence of the metal M.

DETAILED DESCRIPTION OF INVENTION

It has now been discovered that the metal-2-mercaptobenzothiazoles, metal-2-mercaptobenzoxazoles and metal-2-mercaptobenzimidazoles used in preparing the smoke retardant formulations of this invention overcome the disadvantages of the prior art in that they are sufficiently soluble in polyvinyl halides and polystyrenes and are in high enough molecular weight and melting point to prevent either volatility loss or appreciable migration in the plastic on aging. These formulations can be used in any area where a polyvinyl halide or polystyrene material is needed which produces substantially less smoke during combustion than the material produces alone.

Metal-2-mercaptobenzothiazoles, metal-2-mercaptobenzoxazoles and metal-2-mercaptobenzimidazoles are generally prepared by the metathetical reaction of the sodium salt of either 2-mercaptobenzothiazole, 2-mercaptobenzoxazole or 2-mercaptobenzimidazole with a metal halide in aqueous solution to precipitate the new metal compound:

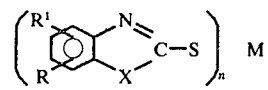

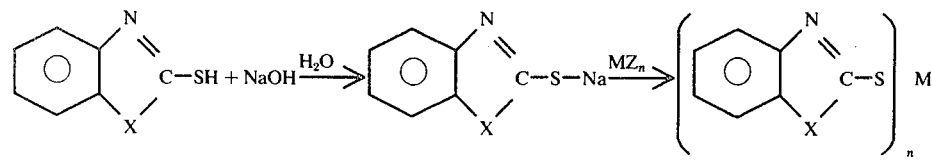

wherein:
- X is either an oxygen, sulfur or $NR^2$ group;
- M is a metal selected from the group consisting of beryllium, magnesium, calcium, strontium, barium, titanium, zirconium, antimony, bismuth, chromium, molybdenum, tungsten, manganese, iron, ruthenium, osmium, cobalt, rhodium, iridium, nickel, palladium, platinum, copper, silver, zinc, cadmium, mercury, aluminum, germanium, tin and lead;
- z is either chlorine or bromine; and n is an integer equal to the valence of the metal.

Representative examples of substituted metal-2-mercaptobenzothiazoles, metal-2-mercaptobenzoxazoles and metal-2-mercaptobenzimidazoles of the invention are:

R, $R^1$ and $R^2$ are independently selected from the group consisting of hydrogen, an alkyl of 1 to 4 carbons such as methyl, propyl or butyl group, an aryl of 6 to 12 carbons such as phenyl, naphthyl or biphenyl, an alkylaryl of 7 to 12 carbons such as toluyl, tetramethylbenzene or dimethylnaphthyl and x is either an oxygen, sulfur or $NR^2$ group. R and $R^1$ can also be a halogen such as chlorine, bromine or fluorine.

As shown above M is selected from the metals from the groups of the Periodic Table IIA, IVB, VB, VIB, VIIB, VIII, IB, IIB, IIIA, IVA, and VA. n is equal to the valence of M. For example, when M is copper or silver with a valence of 1, n is equal to one. When M is zinc, copper, manganese, cobalt, nickel, lead or tin with a valence of 2, n is 2. When M is iron, chromium, bismuth, antimony, vanadium and cerium with a valence of 3, n is 3. When M is titanium or zirconium with a valence of 4, n is 4.

Some illustrative examples are:

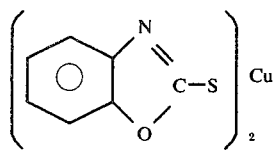

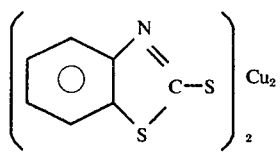

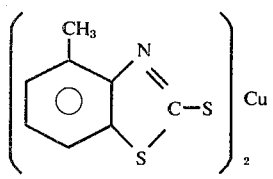

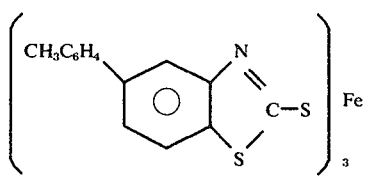

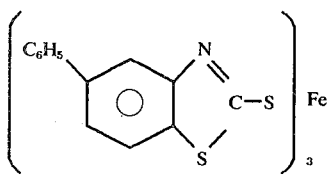

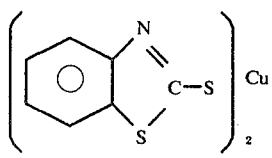

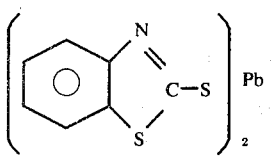

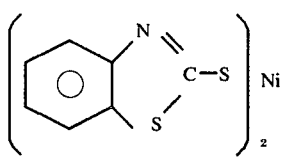

-continued
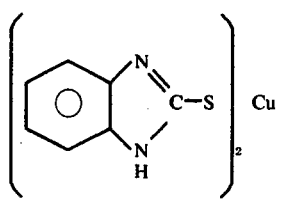
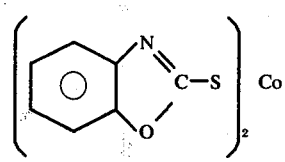
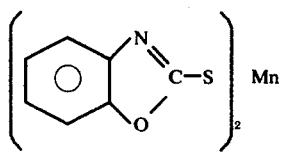
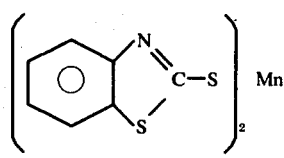
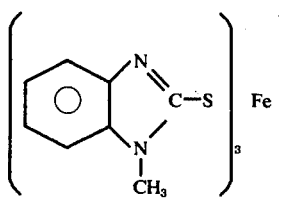
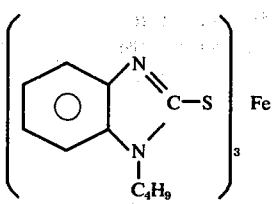
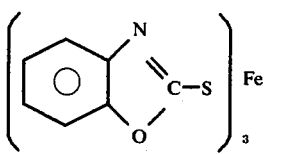
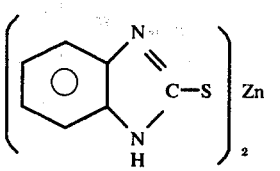
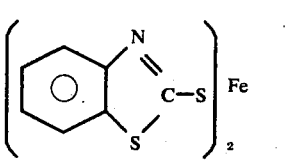
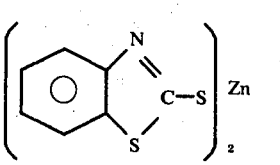
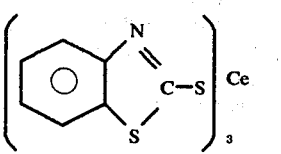
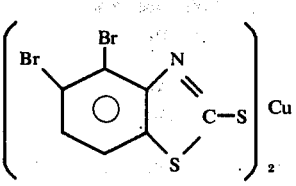
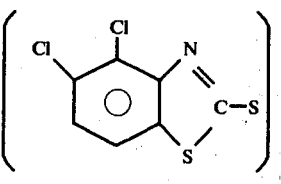
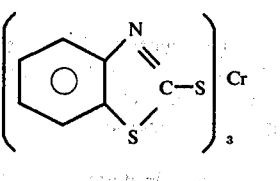
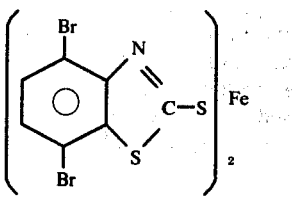
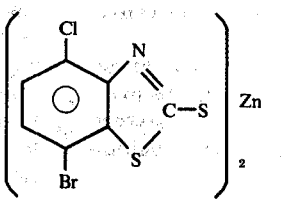

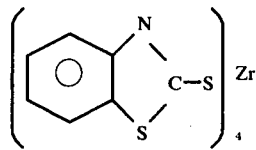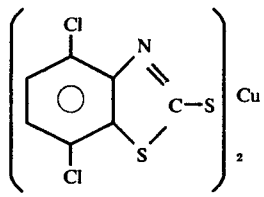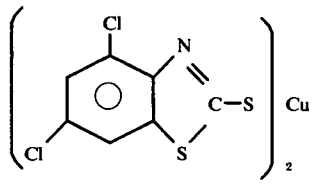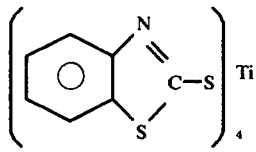

Preferred metal-2-mercaptobenzothiazoles, metal-2-mercaptobenzoxazoles and metal-2-mercaptobenzimidazoles are those based on the metals Fe, Cu, Zn, Co, Pb, and Mn.

Especially preferred examples are:

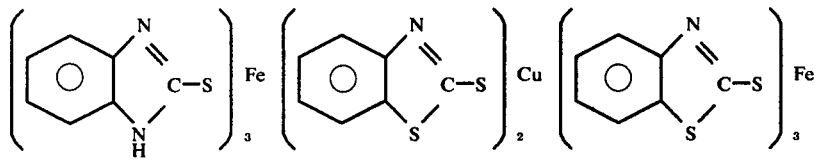

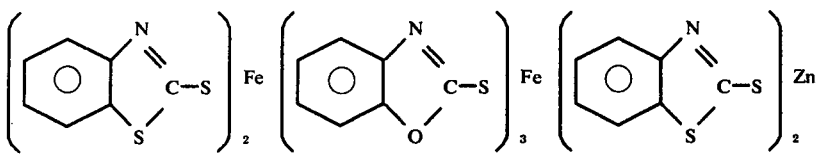

A variety of polyvinyl halide resins are contemplated by this invention. Applicable polyvinyl halides include homopolymers, copolymer, and polymer mixtures as for example:
1. Homopolymers - Polyvinyl chloride, polyvinyl bromide, polyvinyl fluoride, polyvinylidene chloride, polyvinylidene fluoride and the like;
2. Copolymers - Vinyl chloride - vinyl acetate, vinyl chloride - vinyl achohol, vinyl chloride - vinylidene chloride, vinyl chloride - diethyl maleate and the like; and
3. Mixtures - Polyvinyl chloride and polydichlorostyrene, polyvinyl chloride and vinyl acetate - vinyl chloride copolymer, polyvinyl chloride, polyvinylidene chloride and a copolymer of vinyl chloride - diethylmaleate and the like.

Polystyrene resins useful in this invention include homopolymers, copolymers and polymer mixtures prepared from styrene or a substituted styrene derivative. Some typical examples are:
1. Homopolymers - Polystyrene, polyvinyltoluene, polyvinylxylenes, polyα-methylstyrene and the like;
2. Copolymers - Styrene -α-methylstyrene, styrene vinyl xylene, styrene - vinyl toluene, styrene - butudiene and the like; and
3. Mixtures - Polystyrene and polyvinyltoluene, polystyrene and polyα-methylstyrene, polystyrene and polyvinylxylene polystyrene and styrene-butadiene copolymer and the like.

The resins are treated with the smoke retardant additive or mixture of additives in any convenient manner. For example, the additive may be blended or mixed with the resin by techniques available in the art. Additives or mixtures of additives are used in the range of 0.25 to about 30 parts for each 100 parts of the polymer resin and preferably from 1–30 parts are employed. However, greater or lesser amounts can be used if desired.

EXAMPLES

To illustrate the invention, the following examples are presented. In these examples, the smoke retardants are mixed with the resin either by hand or with a Waring Blender, Brabender Plastograph, or plastic mill. The resulting sheets are pressed under pressure to give plates of 1/16-inch thickness. Samples are cut into 1 × 1 × 1/16-inch specimens. The samples are burned in a XP-2 smoke chamber substantially in accordance with ASTM Method D2843-70. The average of two or more values is reported. In some cases, a wire screen is inverted over the sample to prevent the PVC from bending away from the flame. The maximum light obscuration $A_m$ and the total smoke produced are determined from the automatically plotted curves of light-absorption versus time. In the test, an $A_m$ result less than 100 signifies smoke retardation.

EXAMPLES I–IV

Preparation of Sample:

| | Amount |
|---|---|
| Polystyrene Resin (Foster Grant Type 50 Crystal Beads) | 100 g. |
| Smoke Retardant to be Tested | See individual Examples I–VI |

| Ex. No. | Smoke Retardant | Additives M.P. °C | Moles Smoke Retardant Used | $A_m{}^a$ | Total[b] Smoke | % Sample Drip |
|---|---|---|---|---|---|---|
| I | None | — | — | 93 | 60 | 60 |
| II | $(C_6H_5)_4Pb^e$ | 227–228[c] | 0.0128 | 86 | 53 | 50 |
| III | Ferrocene | 173[d] | 0.0108 | 73 | 40 | 60 |
| IV | [structure: (benzisothiazole)$_2$Cu] | 350° | 0.0118 | 84 | 47 | 72 |
| V | [structure: (benzisothiazole)$_2$Zn] | 300° decomp. | 0.0128 | 86 | 53 | 50 |
| VI | [structure: (benzoxazole-thiol)$_3$Fe] | 182–185° | 0.0054 | 83 | 57 | 67 |

[a] The maximum percent light absorption.
[b] The area percent under the light absorption versus time curves for each sample.
[c] B.p. 126° C/13 mm. Hg.
[d] Vapor pressure 2.6 mm Hg at 100° C.
[e] U.S. Pat. No. 3,793,404 (1974).

EXAMPLES VII–XVI

Preparation of Sample:

| | Amount |
|---|---|
| PVC Resin (Type 225 from Tenneco) | 200 g. |
| Stabilizer [dibutyltin bis(isooctyl thioglycolate)] | 4 g. |
| Smoke Retardant to be Tested | See Examples VII–XVI Below |
| Polyethylene Wax (Ross Wax No. 165) | 2 g. |

| Example No. | Smoke Retardant | Additive M.P. °C. | Moles Smoke Retardant Used | $A_m{}^a$ | Total[b] Smoke |
|---|---|---|---|---|---|
| VII | None | — | — | 100 | 90 |
| VIII | Ferrocene | 173[c] | 0.00 | 84 | 70 |
| IX | [structure: (benzisothiazole)$_3$Fe] | 170–175 | 0.0054 | 89 | 72 |
| X | [structure: (benzisothiazole)$_3$Fe] | " | 0.0162 | 81 | 64 |
| XI | [structure: (benzisothiazole)$_2$Cu] | 350 | 0.0054 | 89 | 69 |

EXAMPLES VII-XVI-continued

Preparation of Sample:

| | Amount |
|---|---|
| PVC Resin (Type 225 from Tenneco) | 200 g. |
| Stabilizer [dibutyltin bis(isooctyl thioglycolate)] | 4 g. |
| Smoke Retardant to be Tested | See Examples VII-XVI Below |
| Polyethylene Wax (Ross Wax No. 165) | 2 g. |

| Example No. | Smoke Retardant | Additive M.P. °C. | Moles Smoke Retardant Used | $A_m{}^a$ | Total$^b$ Smoke |
|---|---|---|---|---|---|
| XII | [structure: benzothiazole-S-Cu, n=2] | " | 0.0162 | 85 | 69 |
| XIII | [structure: benzothiazole-S-Cu, n=2] | " | 0.0432 | 86 | 71 |
| XIV | [structure: benzothiazole-S-Co, n=2] | 165-170 | 0.0054 | 92 | 78 |
| XV | [structure: benzimidazole-S-Fe, n=3] | >260° | 0.0108 | 84 | 66 |
| XVI | [structure: benzoxazole-S-Fe, n=3] | 182-185° | 0.0108 | 86 | 63 |

$^a$The maximum percent light absorption.
$^b$The area percent under the light absorption versus Time Curve for each sample.
$^c$Vapor pressure 2.6 mm Hg at 100° C.

This invention also contemplates the use of mixed-metal derivatives of 2-mercaptobenzothiazoles, 2-mercaptobenzoxazoles or 2-mercaptobenzimidazoles, and also of mixtures of metal-2-mercaptobenzothiazoles metal-2-mercaptobenzoxazoles, and metal-2-mercaptobenzimidazoles.

Having described the invention, What is claimed is:

1. A smoke-retardant polymer composition comprising a resin selected from the group consisting of polyvinyl halide and polystyrene admixed with a sufficient amount to reduce smoking of a metal-2-mercaptobenzothiazole, metal-2-mercaptobenzoxazole, or metal-2-mercaptobenzimidazole having the general structure:

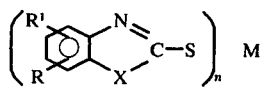

where
a. R, R$^1$ and R$^2$ are independently selected from the class consisting of hydrogen, alkyl of 1 to 4 carbons, aryl of 6 to 12 carbons, and alkylaryl of 7 to 12 carbons, in addition R and R$^1$ can be selected from a halogen;
b. X is selected from oxygen, sulfur or an NR$^2$ group;
c. M is a metal selected from the class consisting of beryllium, magnesium, calcium, strontium, barium, titanium, zirconium, antimony, bismuth, chromium, molybdenum, tungsten, manganese, iron, ruthenium, osmium, cobalt, rhodium, iridium, nickel, palladium, platinum, copper, silver, mercury, aluminum, germanium, and lead; and
d. n is an integer equal to the valence of the metal M.

2. A composition of claim 1 wherein the sufficient amount of the metal-2-mercaptobenzothiazole, metal-2-mercaptobenzoxazole, or metal-2-mercaptobenzimidazole is in the range of 0.25 to 30 parts per 100 parts of the polymer resin.

3. A composition of claim 2 wherein the metals are selected from the group consisting of Fe, Cu, Co, Pb and Mn.

4. A composition of claim 3 wherein the metal-2-mercaptobenzothiazole is

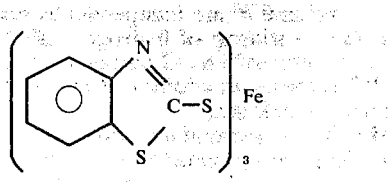

5. A composition of claim 3 wherein the metal-2-mercaptobenzothiazole is

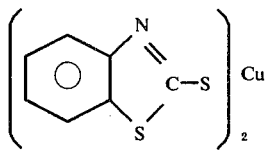

6. A composition of claim 3 wherein the metal-2-mercaptobenzothiazole is

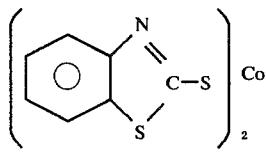

7. A composition of claim 3 wherein the metal-2-mercaptobenzoxazole is

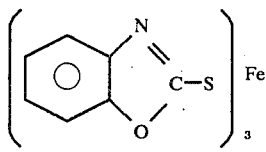

8. A composition of claim 3 wherein the metal-2-mercaptobenzimidazole is

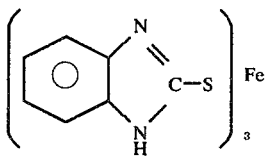

9. A composition of claim 1 wherein R and $R^1$ are independently selected from chlorine or bromine.

10. A composition of claim 1 wherein $R^2$ is selected from hydrogen or an alkyl of 1 to 4 carbons.

11. The process of making a smoke retardant resin selected from the group consisting of polyvinyl halide and polystyrene comprising mixing with the resin a sufficient amount to reduce smoking of a metal-2-mercaptobenzothiazole, metal-2-mercaptobenzoxazole, or metal-2-mercaptobenzimidazole having the structure:

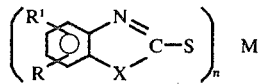

where
a. R, $R^1$ and $R^2$ are independently selected from the group consisting of hydrogen, alkyl of 1 to 4 carbons, aryl of 6 to 12 carbons, and alkylaryl of 7 to 12 carbons, in addition R and $R^1$ can be selected from a halogen;
b. X is selected from oxygen, sulfur or a $NR^2$ group;
c. M is a metal selected from the class consisting of beryllium, magnesium, calcium, strontium, barium, titanium, zirconium, antimony, bismuth, chromium, molybdenum, tungsten, manganese, iron, ruthenium, osmium, cobalt, rhodium, iridium, nickel, palladium, platinum, copper, silver, mercury, aluminum, germanium, and lead; and
d. n is an integer equal to the valence of the metal M.

12. A composition of claim 3 wherein the metal derivative is a mixture of

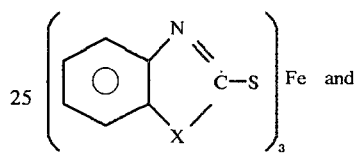

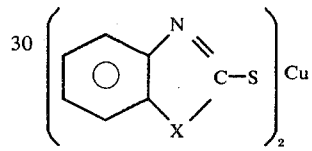

13. A composition of claim 3 wherein the resin is polyvinyl chloride.

14. A composition of claim 3 wherein the resin is polystyrene.

15. A smoke-retardant polymer composition comprising a resin of polystyrene admixed with a sufficient amount to reduce smoking of a metal-2-mercaptobenzothiazole having the general structure:

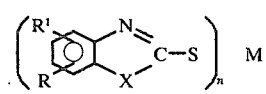

where
a. R, $R^1$ and $R^2$ are independently selected from the class consisting of hydrogen, alkyl of 1 to 4 carbons, aryl of 6 to 12 carbons, and alkylaryl of 7 to 12 carbons, in addition R and $R^1$ can be selected from a halogen;
b. X is sulfur;
c. M is a metal selected from the class consisting of zinc, cadmium, and tin; and
d. n is an integer equal to the valence of the metal M.

16. A smoke-retardant polymer composition comprising a resin selected from the group consisting of polyvinyl halide and polystyrene admixed with a sufficient amount to reduce smoking of a metal-2-mercaptobenzothiazole having the general structure:

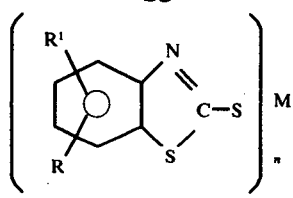
where
a. R, $R^1$ and $R^2$ are independently selected from the class consisting of hydrogen, alkyl of 1 to 4 carbons, aryl of 6 to 12 carbons, and alkylaryl of 7 to 12 carbons, in addition R and $R^1$ can be selected from a halogen;
b. M is tin or cadmium; and
c. $n$ is an integer equal to the valence of the metal M.
* * * * *